Dec. 29, 1925.
J. W. GOSNELL
GEAR TOOTH GAUGE
Filed April 8, 1925
1,567,134
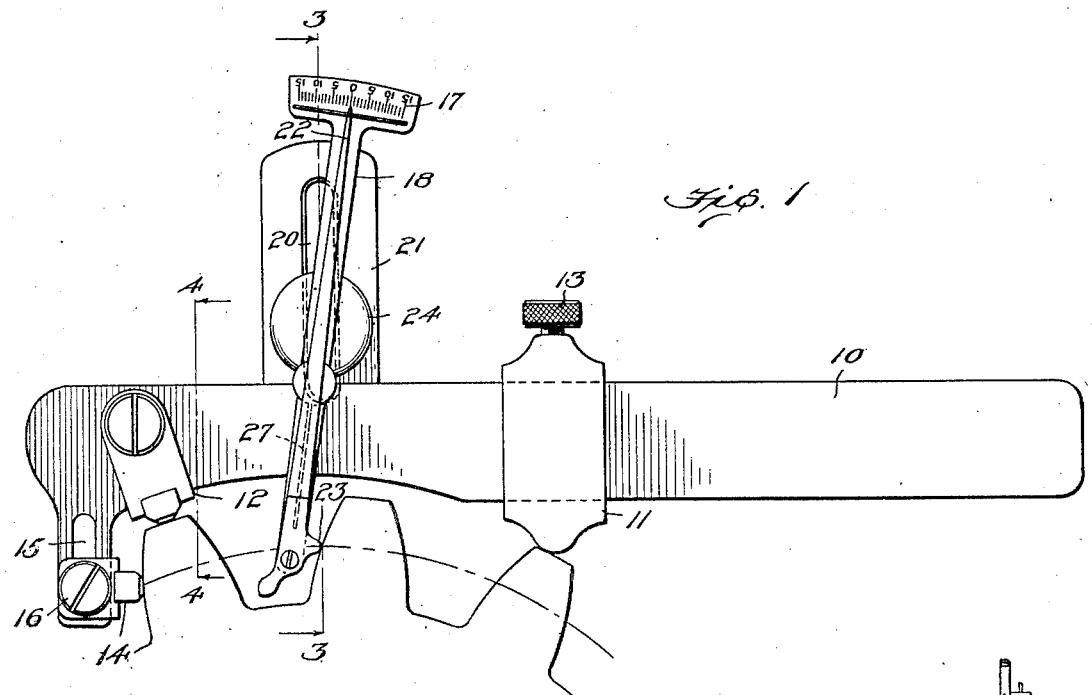
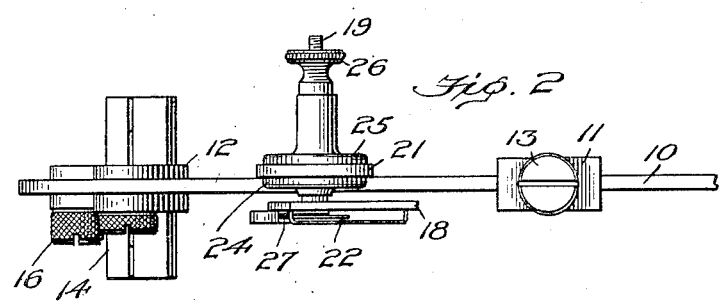
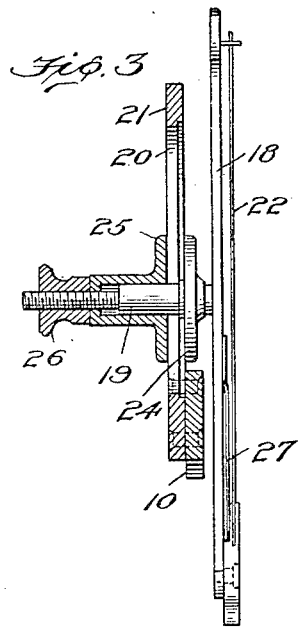
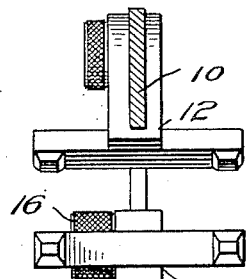
Inventor
James W. Gosnell
By Chusel Khuuch
His Attorney Patented Dec. 29, 1925.

1,567,134

UNITED STATES PATENT OFFICE.

JAMES W. GOSNELL, OF BALTIMORE, MARYLAND, ASSIGNOR TO POOLE ENGINEERING AND MACHINE COMPANY, OF BALTIMORE, MARYLAND, A CORPORATION OF MARYLAND.

GEAR-TOOTH GAUGE.

Application filed April 8, 1925. Serial No. 21,621.

*To all whom it may concern:*

Be it known that I, JAMES W. GOSNELL, a citizen of the United States, residing in the city of Baltimore, in the State of Maryland, have invented certain new and useful Improvements in Gear-Tooth Gauges; and I do hereby declare the following to be a full, clear, and exact description of the same, reference being had to the accompanying drawings, forming part of this specification.

This invention relates to improvements in measuring instruments and particularly to an instrument for measuring or checking up the pitch or tooth spacing of gears.

An object of the invention is to provide an instrument that will uniformly position itself with respect to the successive teeth of the gear, this uniform positioning of the instrument being essential if an accurate check is to be obtained on all of the teeth.

A further object is to simplify the construction of the instrument, thus holding down its cost of production and reducing it to a form that will prove durable and less apt to get out of proper working order.

With these and other objects in view the invention consists in certain novel details of construction and combinations and arrangements of parts, all as will be hereinafter more fully described and the novel features thereof particularly pointed out in the appended claims.

In the accompanying drawings,—

Figure 1 is an elevation illustrating the preferred form of the instrument as it is applied to the teeth of a gear, the pitch line of the gear being indicated by the dot and dash line.

Fig. 2 is a plan view of the instrument.

Fig. 3 is a sectional view on the line 3—3 of Fig. 1; and

Fig. 4 is a sectional view on the line 4—4 of Fig. 1.

The instrument comprises a rather elongated handle 10 and in order that it may be firmly seated on the gear it is provided with two supporting legs 11 and 12 which are adapted to rest upon the face of two teeth of the gear. Said legs may rest upon practically any two teeth, but it is preferred that they be spaced apart a sufficient distance as to enable them to rest on two alternate teeth, the leg 11 being adjustable longitudinally of the handle whereby it can be moved toward or from leg 12 in order that the two legs may bridge three teeth on any size gear. The leg 11 can be locked in its adjusted position by the set screw 13.

The legs 11, 12, limit the movement of the instrument radially of the gear and to limit its movement circumferentially of said gear there is a stop or gauge 14 on the handle. Preferably this stop or gauge 14 is adjustably secured in a slot 15 in a depending end portion of the handle whereby after the instrument is placed with the legs 11, 12, resting on the two teeth, said stop or gauge may be adjusted radially of the gear to a point where it will engage the side of one of said teeth at about the pitch line thereof. Stop 14 may be locked in adjusted position by the set screw 16. These three elements, that is, the supporting legs 11 and 12 and the stop or gauge 14, particularly the two latter, are made comparatively broad so that the instrument is not only held against movement radially and circumferentially of the gear, but it is also prevented from tilting sidewise of the handle. These three elements after being adjusted when the instrument is first applied to the gear remain fixed.

There is a movable indicator mechanism carried by the handle that is adapted to engage a third tooth at the pitch line thereof whereby the distance between the pitch line of the tooth which said indicator engages and the tooth which stop 14 engages may be measured. Preferably this indicator mechanism is located on the handle at a point intermediate the legs 11, 12 and comprises a graduated scale 17, carried by an arm 18 which is pivotally mounted on a pin 19 extending through a slot 20 in a bracket 21 mounted on the handle 10. At the lower end of arm 18 there is pivotally secured an indicator 22 whose free end cooperates with scale 17 and whose pivoted end is provided with a small projection 23 that is adapted to engage the intermediate tooth at the pitch line thereof. The portion of pin 19 extending through slot 20 is rounded in cross section and said pin carries a fixed collar 24 and a movable collar 25 which engage opposite sides of the bracket 21. The extreme end of pin 19 is screw threaded for reception of a screw 26 for clamping the movable collar 25 against said bracket. By backing off screw 26 the arm 18 carrying the indicator may be adjusted vertically in the slot or by rotating the pin said arm may be adjusted longitudinally of the handle.

When the instrument is to be used leg 11 is adjusted longitudinally of handle 10 until the two legs will span three teeth and the instrument is then placed upon the two alternate teeth and stop 14 adjusted radially of the gear until it is brought into engagement with the side of one of said teeth at the pitch line thereof. Arm 18 is then adjusted until the projection 23 on indicator 22 is brought into contact with the side of the intermediate tooth at the pitch line of that tooth. The graduation on the scale with which the indicator then registers is noted and by going around the gear one tooth at a time and watching the scale, any difference on the pitch line of a tooth will be indicated by the fact that the indicator will move to one side or the other of the graduation with which it registered when initially set on the first tooth. If the tooth at the pitch line should be too wide the indicator 22 will be moved against the tension of spring 27 and to the left as viewed in Fig. 1. If the tooth is too narrow the spring 27 will move the free end of the indicator to the right, as viewed in Fig. 1. This spring 27 may be secured at its ends to the arm 18 and to the indicator 22 for thus actuating said indicator. Preferably, however, when the instrument is first set the arm 18 carrying the scale is adjusted so that the indicator, when bearing against the first tooth, will register with zero on the scale. As the indicator has practically as much leverage as the arm, the indicator can be adjusted to register with zero by moving the scale slightly to one side or the other and, if necessary, adjusting the arm just a little vertically in slot 20. With the indicator thus set initially, if the distance between the pitch lines of any two teeth be less than the distance between the pitch line between the two teeth by which the instrument was set, the indicator will be pushed either to the left or right of zero as indicated in Fig. 1.

It will be understood that the instrument is placed against the corresponding sides of successive teeth around the entire gear, after which, by reversing the instrument end for end, the opposite sides of the teeth may be measured in the same way.

The entire instrument is made up of rather heavy material and all its parts are of substantial construction so there is very little likelihood of any of its parts being broken or otherwise put out of order.

What I claim is:

1. In an instrument for measuring the pitch or tooth spacing of gears, the combination of a handle member, two supporting legs spaced longitudinally of said handle and adapted to engage the face of two teeth, a gauge on said handle adapted to engage the pitch line of one of said teeth, a movable indicator carried by said handle adapted to engage the pitch line of a third tooth, and a scale carried by said handle cooperating with said indicator.

2. In an instrument for measuring the pitch or tooth spacing of gears, the combination of a handle member, two supporting legs carried by said handle and adapted to engage the face of two teeth, said legs being adjustable with respect to each other longitudinally of the handle, a gauge on the handle adapted to engage the pitch line of one of said teeth, a movable indicator carried by said handle adapted to enagage the pitch line of a third tooth, and a scale carried by said handle cooperating with said indicator.

3. In an instrument for measuring the pitch or tooth spacing of gears, the combination of a handle member, two supporting legs spaced longitudinally of the handle and adapted to engage the face of two teeth, a gauge secured on the handle and adapted to engage the pitch line of one of said teeth, a movable indicator carried by said handle adapted to engage the pitch line of a third tooth, said gauge and indicator being adjustable transversely of the handle, and a scale carried by said handle cooperating with said indicator.

4. In an instrument for measuring the pitch or tooth spacing of gears, the combination of a handle member, two supporting legs on the handle adapted to engage the face of two teeth, a gauge on the handle adapted to engage the pitch line of one of said teeth, a pivoted indicator carried by said handle adapted to engage the pitch line of a third tooth, and a scale carried by said handle cooperating with said indicator, said pivoted indicator and scale being adjustable with respect to each other whereby the indicator may be brought into registry with the desired graduation on the scale when the instrument is first applied to the gear.

5. In an instrument for measuring the pitch or tooth spacing of gears, the combination of a handle, means on the handle for limiting the movement thereof radially of the gear, means carried by said handle adapted to engage the pitch line of a tooth limiting the movement of the handle circumferentially of the gear, a movable indicator carried by said handle adapted to engage the pitch line of a second tooth, and a scale carried by said handle cooperating with said indicator.

6. In an instrument for measuring the pitch or tooth spacing of gears, the combination of a handle member, two supporting legs on the handle adapted to engage the face of two alternate teeth for limiting the movement of the handle radially of the gear, means carried by said handle adapted to engage one of said teeth at the pitch line thereof for limiting movement of the handle circumferentially of the gear, a movable indicator supported on said handle adapted to engage the intermediate tooth at the pitch line thereof, and a scale carried by said handle cooperating with said indicator.

JAMES W. GOSNELL.